United States Patent [19]

Schwab

[11] Patent Number: 5,269,499
[45] Date of Patent: Dec. 14, 1993

[54] SNAP SPRING POSITIONING DEVICE

[76] Inventor: Pierre P. Schwab, 1768 SE. Clearmont St., Port St. Lucie, Fla. 34983

[21] Appl. No.: 911,006

[22] Filed: Jul. 9, 1992

[51] Int. Cl.$^5$ ............................ F16F 1/18; H01H 13/14
[52] U.S. Cl. ................................ 267/159; 200/5 A; 200/290; 337/365
[58] Field of Search ............................ 267/159–165; 200/83 P; 337/365

[56] References Cited

U.S. PATENT DOCUMENTS

| | | | |
|---|---|---|---|
| 2,361,193 | 10/1944 | Gray | 267/159 |
| 2,368,193 | 1/1945 | Boynton | 267/159 |
| 2,516,236 | 7/1950 | Moorhead et al. | 267/159 |
| 2,624,819 | 1/1953 | Spina et al. | 200/67 DA |
| 2,629,791 | 2/1953 | Le Tourneau | 200/67 D |
| 2,753,544 | 7/1956 | Cox et al. | 267/159 |
| 3,909,768 | 9/1975 | Woods | 337/380 |
| 4,751,351 | 6/1988 | Lambke | 200/67 D |
| 4,760,221 | 7/1988 | Yoshida et al. | 200/67 D |
| 4,822,959 | 4/1989 | Schwab | 200/5 A |
| 5,149,150 | 9/1992 | Davis | 267/159 |

FOREIGN PATENT DOCUMENTS 360223 2/1938 Italy .
1472719 4/1989 U.S.S.R. .

Primary Examiner—Robert J. Oberleitner
Assistant Examiner—Chris Schwartz

[57] ABSTRACT

A snap-acting positioning device comprising an enclosure, including a spring member having a plurality of sine-shaped bow sections disposed equidistantly in a circular pattern to take a disc shape and stressed to cause the spring member to take a substantially dome-shaped configuration and the sine-shaped bow sections to store a predetermined amount of energy. The spring member is made of flexible material and is adapted to co-act with an activating member to define a snap-acting function. The snap-acting device is capable for employment in snap-acting valves, snap-fasteners, linear positioning devices, vibration and shock reduction hardware and spring suspensions for rotating machinery.

17 Claims, 3 Drawing Sheets

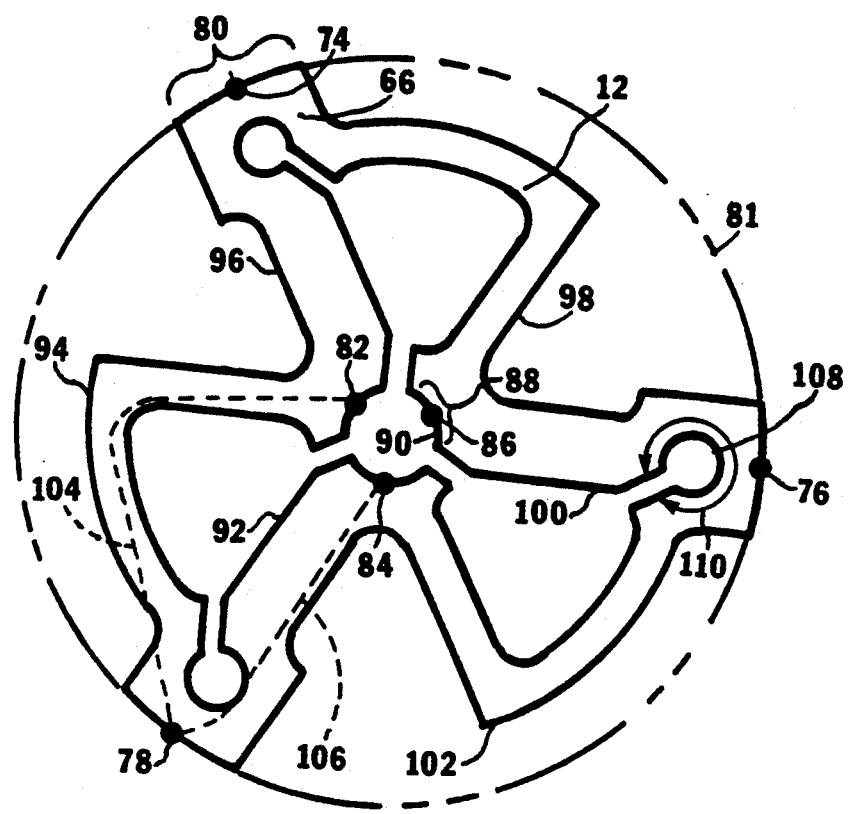
FIG_11

SNAP SPRING POSITIONING DEVICE

BACKGROUND OF THE INVENTION

This invention relates in general to an improved planar, and preferably disc shaped snap-acting spring capable of overcenter snap-action to provide precise reciprocating motion for linear positioning devices, pistons, valves or fasteners or to provide radial spring support and suspension for rotating machinery or vibration absorbing devices, and still more particularly, to a snap-acting spring element capable of being adjusted to change its snap-acting characteristics, and furthermore, capable of being mechanically biased to provide monostable operation.

DESCRIPTION OF RELATED ART

Heretofore, it has been well known to provide overcenter snap springs for fasteners and electrical control devices such as thermostats and switches. U.S. Pat. Nos. 404,284; 1,342,738; 1,995,116; 2,361,193; and 2,368,193 disclose a diversity of disc-shaped spring elements which provide limited spring-action with monostable or bistable operation for various controls. In these patents longitudinal motion (throw) at the center of the disc is very much restricted by structural limitations when force is applied to snap the disc from one stable position into the other. Furthermore, snap forces can only be controlled over a minimal range of values. Boynton U.S. Pat. No. 2,368,193 very well illustrates the concept for a bistable snap disc and its utility as a thermal control device. The limited spring and snap action of the Boynton invention is clearly visible from FIGS. 3 and 5.

U.S. Pat. No. 4,822,959 (Schwab), specifically incorporated by reference herein, largely overcomes these limitations using a ribbon-type spring element with a plurality of inner and outer loops which are stressed by an activating member to take on a substantially dome-shaped configuration capable to reciprocate back and forth and store a predetermined amount of spring energy. The utility of this patent applies to electrical switches, providing an improved tactile feel to the operator and a means for adjusting snap forces by means of an activating member. While this patent provides a significant improvement over prior art in snap-spring design, its utility is limited to activating a contact for a snap-acting electrical switch in keyboards. A further limitation is presented by the geometry and configuration of the disc-shaped spring element. The spring consists of inner and outer loops which, at the moment of snapping overcenter, expand outward by the amount of mechanical interference provided for stressing by the activating member. Thus, the spring disc diameter continuously expands and contracts as it is snapped through center during operation. Accordingly, clearance for the expanding diameter of the snap disc must be provided within the enclosure in which the snap disc is placed. As a result the disc cannot be precisely fitted within an enclosure to be captivated by its outer diameter, as this would seriously impede its spring and snap-acting capability. In general, disc-shaped snap springs have a limited spring and snap capability, comparable to the snap-action of an old fashioned "Oil Can". The present invention provides a substantially large "throw" or reciprocal movement and precise, adjustable control over the snap-acting forces.

SUMMARY OF THE INVENTION

The present invention overcomes the heretofore known limitations experienced with disc-shaped snap spring elements and provides an improved snap acting spring element having a higher degree of elasticity and a unique shape that allows for the periphery to be tightly fitted into a captivating recess minimizing sacrifice to elasticity or snap-action and where the size may be significantly reduced while retaining a substantial snap-action capability.

The snap spring the present invention includes a preferably disc-shaped (but not limited to that shape) planar spring member having a plurality of substantially sine-shaped spring segments interconnected by a "knee" portion and arranged in a circular pattern, connecting said sine-shaped sections end to end to take on a disc shape, forming a plurality of loops and means for stressing the loops to attain a dome shape. Preferably, the means for stressing the loops and deforming the spring member include an activating member centrally mounted on said spring member. Both the spring member and the activating member may be precisely made to provide precision operation. The activating member may be suitably sized to provide the desired force requirement of operating the element as necessary. Thus, changing the size of the activating member for a given spring member, or vice versa, will adjust the snap-acting characteristics. The planar spring member is preferably disc shaped, but not limited to that shape and made from material with good spring properties to provide optimal operation while the activating member can be made from suitably shaped solid material. Depending on the environment or application on which the snap-acting element is used, the activating member will be made for producing monostable or bistable operation. The shape of the sine-shaped spring segments which are forming the loops of the spring member may vary depending upon the desired spring and snap force characteristics. It will be understood that the spring member is first formed by stamping, etching or otherwise and takes a planar shape. The activating member would then be mounted centrally of the disc-shaped spring member for stressing the loops to attain a generally dome-shaped configuration.

It is therefore an object of the present invention to provide a new and improved snap spring or overcenter device with much improved and substantially large throw characteristics, capable of repetition over an extended life period.

Another object of the invention is to provide a spring which can be made snap-acting by means of an activating member and which will produce monostable or bistable operation, depending on the design of the activating member or other bias applied to the snap spring for monostable operation.

A further object of the present invention is to provide a snap spring positioning device, including a planar flexible member having a plurality of interconnected, substantially sine-shaped spring segments, each end of which is provided with a "knee" portion to form an equal plurality of interconnected loops and means for stressing the loops and deform the element to take a substantially dome shape.

It is an object of the invention to provide a snap spring positioning device, including a spring member and activating member, which can easily be adjusted to provide a desired snap acting characteristic or snap force.

Yet another object of the present invention is to provide a disc-shaped spring member which can be precisely fitted into a recess, where the expanding outer diameter of the spring, during overcenter snap, is provided with clearance to accommodate the expanding diameter but where "knee" portions of the spring segment provide a means for tightly fitting the disc-shaped spring element within the provided mounting means.

A further object of the invention is to provide a snap spring positioning device comprising a planar and preferably disc-shaped spring member, a means for mounting the spring member and an activating member for stressing said spring member, said positioning device being capable of employment as a snap-acting control mechanism in valves designed to regulate the release or shut-off of air, gases or fluids at specific values of pressure.

Another object of the invention is to provide a snap spring positioning device comprising a planar and preferably disc-shaped spring member, such as described in the present invention, a means for mounting the spring member and an activating member for stressing said spring member, said positioning device designed to provide, but not limited to, reciprocal action such as in pumps or other machinery.

Still another object of the present invention is to provide a planar spring member having a high radial or transverse spring rate and a low axial or longitudinal spring rate and mounting means therefor, capable of overcenter snap action for employment in axial spring suspensions used in rotating machinery, vibration or shock protection devices and other structural assemblies which may benefit from the spring suspension or snap action.

Yet a further object of the present invention is to provide a planar spring member and mounting means therefor, capable of employment as a snap-action retaining device where a suitably shaped member may be snapped in and out of said snap-action retaining device where the required force to insert or remove the activating member may be accurately foretold.

Another object of the invention is to provide a planar and preferably disc-shaped spring member, such as described in the present invention, and a mounting means designed to block the bistable capability of the spring member to retain its planar shape, and where a force applied to the activating member will cause the interconnected sine shaped segments to expand and exert an opposing force capable to hold and grip the activating member captive within the disc-shaped spring member with a force which may be accurately foretold.

Still further, it is an object of the invention to provide a snap spring positioning device comprising a plurality (stack) of planar and preferably disc-shaped spring members, such as described in the present invention, a means for mounting the spring members, and an activating member for stressing said spring members, the entire assembly comprising the "stack" of spring members being capable of operating in unison, like a single spring member, thus providing a means for increasing snap-forces indefinitely, depending on the quantity of spring elements used.

These and other objects of the invention are provided by a novel snap spring element comprising a plurality of sine-shaped segments interconnected end to end by a "knee" portion arranged in a circular pattern, endless ribbon fashion, to form a plurality of loops which are stressed to become snap acting and attain a dome shape with the insertion of a suitably sized activating member which may be mounted to be used or employed as an overcenter snap device, a means for axial spring support or as a spring retainer and where the spring forces required to snap or retain may be accurately foretold.

BRIEF DESCRIPTION OF THE DRAWINGS

FIG. 11 illustrates one embodiment of the invention with the hub support points and peripheral support points denoted.

DESCRIPTION OF THE PREFERRED EMBODIMENT

The snap-acting spring element of the present invention can take many forms and can be used in either monostable or bistable arrangements. Particularly, it includes a generally disc-shaped spring member of flexible material and an activating member that may be structured to co-act with the spring member for monostable or bistable operation. The spring member is unique in that it consists of a continuous, substantially circular ribbon that includes a plurality of preferably sine-shaped or bowlike segments with each segment ending in a "knee" portion connecting to the next adjacent segment, to form a plurality of loops arranged to take a substantially disc shape.

Figure 1:
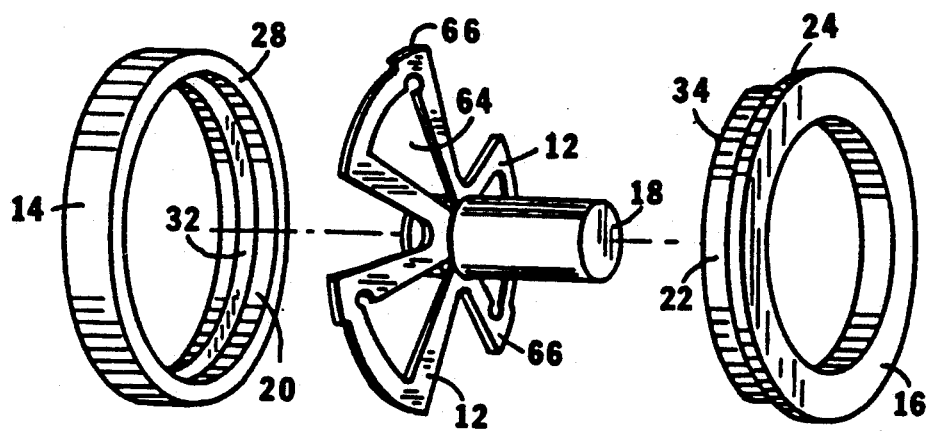
FIG. 1 is an exploded perspective view of an overcenter snap spring assembly made according to the present invention and which includes a disc-shaped spring member, the activating member and mounting means therefor.
Figure 2:
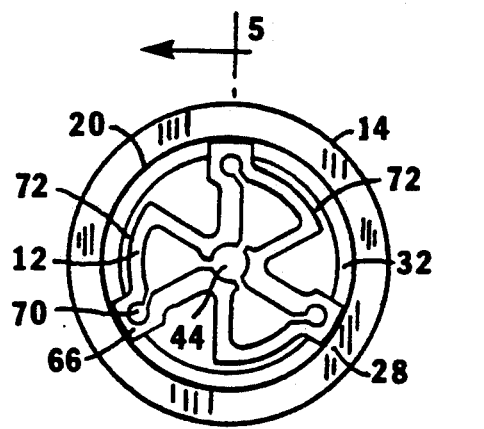
FIG. 2 is a top plan view of the snap spring assembly of FIG. 1 with the activating member and the top captivating flange element removed.
Figure 3:
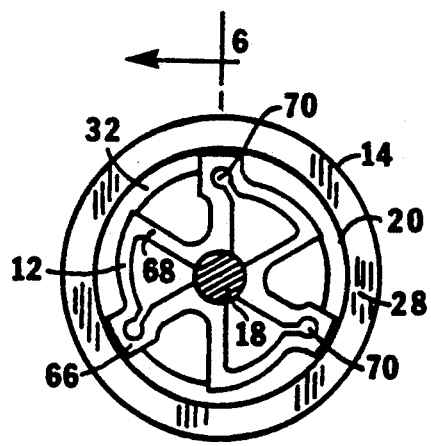
FIG. 3 is a top plan view of the snap spring assembly of FIG. 1 with a transverse sectional view through the activating member inserted to stress and energize the spring member of the present invention to assume a dome shape.
Figure 5:
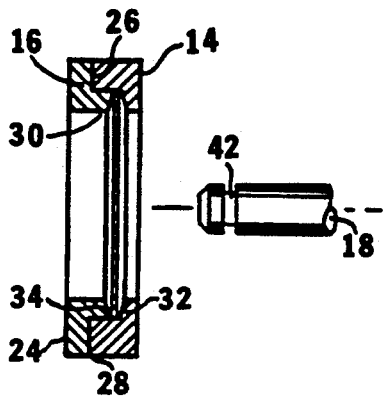
FIG. 5 is a somewhat schematic transverse sectional view through the top plan view of FIG. 2, substantially along line 4—4 thereof and illustrating the captivated spring member with the activating member removed.
Figure 6:
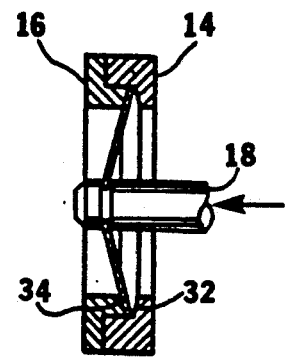
FIG. 6 is a somewhat schematic transverse sectional view through the top plan view of FIG. 3, substantially along line 5—5 thereof and illustrating the captivated spring member with the activating member engaged and where the spring member is stressed to assume a dome shape and has snapped into one of two possible stable positions of equilibrium.
Figure 7:
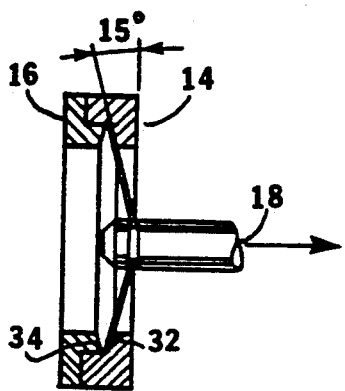
FIG. 7 is a somewhat schematic transverse sectional view through the top plan view of FIG. 3, substantially along line 5—5 thereof and illustrating the stressed spring member and activating member having snapped into the second of two possible stable positions.

Referring now to the drawings and particularly to the embodiment of FIGS. 1 to 3 the preferred snap spring member of the present invention, generally designated by the numeral 12, is illustrated in the exploded perspective view FIG. 1 of the snap spring assembly. The snap spring assembly includes a housing designed to captivate snap spring member 12 and comprises an annular base 14, a top part 16 within which snap spring member 12 is captivated or mounted and an activating member 18 which is stressing and energizing snap spring member 12. In the embodiment of FIG. 1, annular base 14 and top part 16 are designed to engage into one another in a suitable interference fit (press fit), i.e., after snap spring member 12 is placed inside recess 20 provided in annular base 14, as shown in FIG. 2, the barrelled portion 22 of top part 16 is pressed into recess 20 by means of a press until inner surface 26 of flange portion 24 and top surface 28 of annular base 14 come into firm contact with each other as shown in FIG. 5. Annular base 14 and top part 16 are designed to provide an annular "V" shaped groove 30, formed by opposing frustoconical walls 32 and 34 inside of which snap spring member 12 is captively retained and allowed to snap back and forth. Experience has shown that in one embodiment of this invention snap spring member 12 generally assumes a dome shape having an included angle of approximately 150 degrees after stressing. Accordingly, the "V" groove, formed by frustoconical walls 32 and 34 of annular base 14 and top part 16, should be designed to clear a 15 degree angle for snap spring element 12 to deflect a full throw, as shown in FIGS. 6 and 7.

Figure 8:
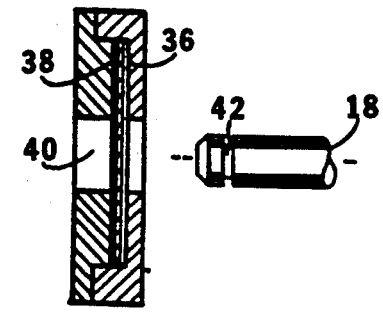
FIG. 8 is a somewhat schematic transverse sectional view through a top plan view, similar to FIG. 2, where the wall elements of the captivating enclosure are modified to restrict the snap spring element from moving to either side, providing transverse or radial spring action when longitudinal motion is not desired.

FIG. 8 illustrates another embodiment of the invention in which the longitudinal deflection of snap spring element is essentially blocked and where the snap spring assembly FIG. 1 provides transverse or radial spring action when needed for gripping or suspension purposes and longitudinal displacement is not desired. To achieve this purpose, the annular base 14 and top part 16 are modified as illustrated. In this embodiment, the opposing frustoconical walls of annular base 14 and top part 16 are modified to be planar and to be spaced apart to allow for the thickness of spring member 12 to be captive in a way that provides a minimal clearance for the spring so as not to impede its spring action. Furthermore, the area of opposing planar surfaces 36 and 38 of annular base 14 and top part 16 are designed to retain as much of spring member 12 as possible, providing an aperture just large enough for passage through of activating member 18.

In order to provide bistable operation for snap spring member 12, activating member 18 is provided with an annular groove 42 designed to stress snap spring 12 and to provide pivotal action. The root diameter of groove 42 determines the amount of mechanical interference with aperture 44 of snap spring member 12. Bistable operation is illustrated in FIG. 6 where it is shown how activating member 18 has been forced through the center aperture 44 of snap spring element 12, causing it to stress and assume a dome shape and taking a first position of stability. FIG. 7 shows how activating member 18 has been moved into its second position of stability, after force has been applied along the longitudinal axis of activating member 18, in the direction shown. Stress and snap action characteristics of snap spring 12 are a direct result of the interference between the root diameter of annular groove 42 of activating member 18 and the diameter of aperture 44 of spring member 12. In addition, these characteristics are dependent on the type and thickness of material used. While minimal experimentation can be used to work with different values of interference, and provides a valid means to achieve a specific force, Computer Aided Design (CAD) will allow to design and shape spring members with predictable characteristics to a great degree of accuracy. For most practical purposes activating member 18 is provided with a groove having straight walls as illustrated in FIGS. 5 to 8 having a depth equal to twice the material thickness and a width of one and one-half the material thickness of spring member 12.

Figure 9:
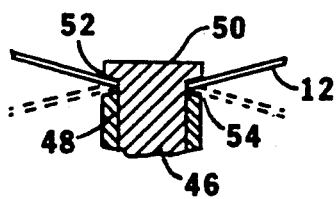
FIG. 9 is a transverse sectional view through the top plan view of FIG. 2, substantially alone line 4—4 thereof and illustrating the annular "V" shaped groove detail of the activating member for bistable action.

If for any reason it is important that the activating member must not easily be detachable from the snap spring assembly of FIG. 1, then the diameter needs to be enlarged to captivate more of the central area of spring member 12 and it is then desirable to shape the walls of groove 42 in a "V" shape corresponding to the 15 degree deflection angle of the stressed spring member 12. If the diameter of activating member 18 is substantially made larger, then it would not be possible to force it through aperture 44 of the snap spring element 12 without exceeding the elastic limits of the spring material and thus causing damage. FIG. 9 illustrates how damage can be avoided by using a two-part construction for activating member 18. In this embodiment of the invention, the "V" groove is formed by the press-fit assembly of pin 46 and sleeve 48, where the pin comprises a flange portion 50 having a frustoconical inner surface 52 and where on side of the sleeve has a frustoconical shape to form the opposing frustoconical wall of the annular, "V" shaped groove, after pin 46 and sleeve 48 are assembled. The width of the groove at the base as shown is substantially equal to the thickness of the snap spring material. In this embodiment of the invention pin 46 is first forced through aperture 44 of spring member 12 and then pressed into sleeve 48 using fixtures or equipment commonplace in manufacturing technology.

Figure 10:
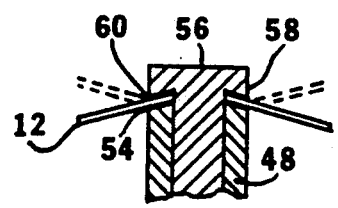
FIG. 10 is a transverse sectional view through the top plan view of FIG. 3, substantially along line 5—5 thereof and illustrating the activating member having an annular groove with parallel frustoconical walls to cause the activating member to bias the snap spring element for monostable operation.

In order to provide monostable operation, one embodiment of this invention is to modify the "V" shaped annular groove of the activating member, used for bistable operation, to the configuration illustrated in FIG. 10. While there are many other means to bias spring member 12 to operate in a monstable (snap-back) mode, FIG. 10 illustrates a method which allows exceptionally good control over the snap-back characteristics of the assembly, during manufacturing. In this embodiment pin 56 is provided with a flange portion having a frustoconical inner surface to form an annular groove having parallel frustoconical walls after press-ft assembly into sleeve 48. It should be clear that the resulting frustoconical annular groove should substantially extend at an angle equal to the angle assumed by snap spring element 12 after stressing for best results. Separation between pin 56 and sleeve 48 after assembly determines the snap-back characteristics of the snap spring assembly. These characteristics will range from bistable operation, when the gap between parallel frustoconical walls 60 and 54 of FIG. 10 is excessively large or is approaching twice the material thickness of spring member 12, to a rigid dome-shaped spring without snap, when pin 56 and sleeve 48 are engaged in a press fit which solidly clamps a substantial peripheral portion of spring member 12 near the center of aperture 44. It should be clear that if sleeve 48 were threaded on its inner diameter and engaged a screw with a head having a frustoconical undercut, substantially identical results would be achieved.

Figure 4:
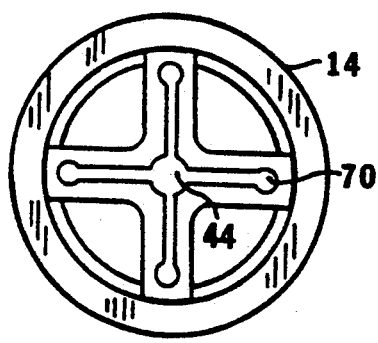
FIG. 4 is another possible disc-shaped member differing in the shape of the preferred embodiment of FIG. 2.

Experience has shown that the best results for monostable snap spring operation is achieved when the spacing between pin 56 and sleeve 48 provides a groove width which is equal to one time the material thickness of snap spring element 12 plus 20 to 30 percent of that thickness. This amount of spacing between frustoconical walls 54 and 60 of FIG. 10 provides favorable clearance for snap spring element 12 to retain a substantial degree of pivotal action for snapping and the same time act as a mechanical stop at the inner side of flange portion 58 to return snap spring element 12 back to its first position of stability, when operated. It should be understood that "operating" means to apply a force to activating member 18 illustrated in FIG. 1 in a direction opposing the snap spring elements assumed dome shape, similar to the configuration shown in FIG. 7. In this embodiment spring member 12 will move through center with a slightly diminished snap action but will promptly snap back into its normal position of stability upon release of the activating force. The spring member according to the present invention includes a plurality of substantially sine-shaped segments arranged equidistantly in a circular pattern and which are interconnected end-to-end by knee portions 66 to form and endless ribbon and take on a disc shape. Knee portions 66 are split and comprise a circular cutout and slot detail 70 which determine the total spring capability of each sine-segment, depending on their configuration and size. The spring member 12 includes three sine-shaped segments, although it should be appreciated that any suitable number could be provided. An embodiment having four interconnected segments of a different shape is illustrated in FIG. 4. It should be appreciated that the spring member of the present invention can be made in any suitable size as it will still provide substantial snap characteristics when reduced to a quarter of an inch in diameter or even less. The spring member 12 is activated or energized upon insertion of activating member 18 into central spring aperture 44 where the amount of interference between the diameter of aperture 44 and the root diameter of groove 42 stresses the spring in a planar fashion, causing it to become unstable in that plane and therefore assume a first stable position and a substantially dome shape. During this process each sine-shaped segment and knee portion thereof works like an archer's "bow", storing spring energy corresponding to the amount of stress caused by the outward movement of the radially extending straight portions 68, comparable to the arrow of the bow.

It is a major embodiment and unique aspect of the present invention to have applied the principle of the archer's bow to the snap spring element of the present invention to give it the greatest possible degree of elasticity. A second major feature of the present invention is the unique addition of "knee" portion to connect sine segment to sine segment. Knee portions 66 further improve the bow action or capacity to spring member 12. More importantly, knee portions 66 provide a means for tight fitting inside recess 20 of annular base 14 while leaving a suitable clearance 72 or spring member 12 to expand when thrown overcenter as shown in FIGS. 2 and 3.

A third important feature of the invention is that knee portions 66 provide the anchor points for the sine-shaped bow segments to oscillate back and forth with each overcenter snap. Deformation of spring member 12, after stressing with the activating member 18 and during overcenter snap, is substantially concentrated in the knee portions where it is minimal, resulting in low compressive and torsional stresses allowing the spring member of this invention to operate repeatedly for millions of cycles.

Referring to FIG. 11, spring member 12 includes three peripheral support points 74, 76 and 78, each defined as the midpoint of the length 80 of a section of knee portion 66 lying on periphery 81. Spring member 12 also includes three hub support points 82, 84 and 86, each defined as the midpoint of the length 88 of each hub land area 90. Six arms, 92, 94, 96, 98, 100 and 102 connect the hub points to the peripheral points. Each peripheral point is coupled to two hub points by way of two arms. For example, peripheral point 78 is coupled to hub points 82 and 84 by way of arms 94 and 92, respectively.

For effective snap action, the two arms 92 and 94 are of different lengths. More specifically, the hub to peripheral material distance 104 of arm 94 is longer than the hub to peripheral material distance 106 of arm 92. The material distance is defined as the shortest distance from a hub point to a peripheral point through a path passing only through the structural material of spring member 12. The structural material is that which stores and releases most of the spring energy of spring member 12 and does not include thin plastic membranes that may be bonded in place merely to serve as an electrical insulator or dust shield.

Still referring to FIG. 11, arms 102 and 100 join at peripheral support point 76 to define a curve 108 of at least 270 degrees as denoted by numeral 110. This curve provides a split knee portion that enhances the snap action and life of spring member 12.

While the method of stressing the spring member has been shown and described as depending upon a centrally disposed activator, it should be appreciated that stressing could be achieved by constraining the outer periphery of the spring at the knee portions of a dimension smaller than when in the unstressed condition. Further, it should be appreciated that the groove for defining monostable or bistable operation could be disposed at the periphery of the spring member and act on the periphery of the knee portions of the spring member. With such an arrangement, the root groove diameter of the activating member passing through aperture 44 would not have to be oversized to prestress spring member 12.

In another embodiment of the invention, spring member 12 is self-strained to exhibit bistable operation by being formed partially hemispherical rather than flat. In this way, neither the activating member nor the housing are needed to strain spring member 12 except, if desired, to limit the travel of spring member 12 to monostable operation.

Additionally, it should be clear that the housing or enclosure designed to captivate the spring member of this present invention can take on other shapes than those described and that the snap spring member can be made a part of any other housing or enclosure designed to captivate said spring member to perform a snap-acting spring function.

It will be understood modifications and variations may be effected without departing from the scope of the novel concepts of the present invention, but it is understood that this application is to be limited only the scope of the claims which follow.

I claim:

1. A spring member made of a flexible material with a center aperture, comprising:
   a) at least three peripheral support points, each being defined as a midpoint of a portion of said spring member lying on an outermost periphery of said spring member;
   b) at least three hub land areas being segmented and circumferentially spaced apart from each other to define said center aperture;
   c) at least three hub support points with a hub support point centrally located at the innermost circumference of each of said at least three hub land areas; and
   d) at least six arms with two of said arms coupling each of said peripheral support points to two of said at least three hub support points, one of said two arms having a hub to peripheral material distance that is greater than the other of said two arms, where said material distance is defined as the shortest distance from a hub support point to a peripheral support point through a path passing only through said material of said spring member.

2. The spring member of claim 1, wherein said spring member is strained to exhibit two states of equilibrium where in one state of equilibrium said at least three hub points are offset out of coplanar alignment to one side of a plane defined by three of said at least three peripheral support points, and in the other state of equilibrium said at least three hub points are offset out of coplanar alignment to the opposite side of said plane, thereby effecting bistable operation.

3. The spring member of claim 2, wherein said spring member is strained by an activating member extending through said center aperture of said spring member.

4. The spring member of claim 2 wherein said spring member is strained by a housing pushing against said at least three peripheral support points.

5. The spring member of claim 1, wherein said spring member is strained to exhibit only one state of equilibrium where said at least three hub support points are offset out of coplanar alignment to one side of a plane defined by three of said at least three peripheral support points, thereby effecting monostable operation.

6. The spring member of claim 5, wherein said spring member is strained by an activating member extending through said center aperture of said spring member.

7. The spring member of claim 5, wherein said spring member is strained by a housing pushing against said at least three peripheral support points.

8. The spring member of claim 1, wherein said spring member is supported by a housing that urges said spring member to one state of equilibrium where said member is substantially flat with said at least three hub support points and said at least three peripheral support points lying in substantially the same plane.

9. The spring member of claim 8, wherein said housing and said spring member are sized to provide radial clearance between said housing and said spring member.

10. The spring member of claim 1, wherein said at least three peripheral support points are spaced substantially equally apart around the periphery of said spring member.

11. The spring member of claim 1, wherein said two of said arms join at one of said at least three peripheral support points to define a curve of at least 270 degrees.

12. A spring member made of a flexible material with a center aperture, comprising:
   a) three peripheral support points spaced substantially equally apart around the periphery of said spring member, each being defined as a midpoint of a position of a portion of said spring member lying on an outermost periphery of said spring member;
   b) three hub land areas being segmented and circumferentially spaced apart from each other to define said center aperture;
   c) three hub support points with a hub support point centrally located at the innermost circumference of each of said hub land areas; and
   d) six arms with two of said arms coupling one of said peripheral support points to two of said hub points, said two arms joining at said one peripheral support point to define a curve of at least 270 degrees, one of said two arms having a hub to peripheral material distance that is greater than the other of said two arms, where said material distance is defined as the shortest distance from a hub point to a peripheral point through a path passing only through said material of said spring member.

13. The spring member of claim 12, further comprising an activating member extending through said center aperture and a housing supporting said peripheral points, with at least one of said activating member and said housing serving to strain said spring member to exhibit only one state of equilibrium where said three hub support points are offset out of coplanar alignment to one side of a plane defined by said three peripheral points, thereby effecting monostable operation.

14. The spring member of claim 12, further comprising an activating member extending through said center aperture and a housing supporting said peripheral points, with at: least one of said activating member and said housing serving to strain said spring member to exhibit two states of equilibrium where in one state of equilibrium said hub support points are offset out of coplanar alignment to one side of a plane defined by said three peripheral points, and in the other state of equilibrium, said hub support points are offset out of coplanar alignment to the opposite side of said plane, thereby effecting bistable operation.

15. The spring member of claim 12, wherein said spring member is supported by a housing that urges said spring member to one state of equilibrium where said spring member is substantially flat with said three hub points and said three peripheral support points lying in substantially the same plane.

16. The spring member of claim 12, wherein said housing and said spring member are sized to provide radial clearance between said housing and said spring member, 17. A snap spring comprising:
   a) a spring member with a center aperture;
   b) three peripheral support points spaced substantially equally apart around the periphery of said spring member, each being defined as a midpoint of a point of said spring member lying on an outermost periphery of said spring member;

c) three hub land areas being segmented and circumferentially spaced apart from each other to define said center aperture;
d) three equally spaced apart hub support points disposed around said center aperture with a hub support point centrally located at the innermost circumference of each of said hub land areas;
e) a housing supporting said peripheral support points;
f) at least six arms with two of said arms coupling one of said peripheral support points to two of said hub support pons, said two arms joining at said one peripheral support point to define a curve of at least 270 degrees, one of said two arms having a hub to peripheral material distance that is greater than the other of said two arms, where said material distance is defined as the shortest distance from a hub support point to a peripheral support point through a path passing only through said material of said spring member; and
g) an activating member extending through said aperture to strain said spring member to exhibit two states of equilibrium where in one state of equilibrium said hub support points are offset out of coplanar alignment to one side of a plane defined by said three peripheral support points, and in the other state of equilibrium said hub support points are offset out of coplanar alignment to the opposite side of said plane, thereby effecting bistable operation.

* * * * *